USO10179524B1

(12) United States Patent
Caye et al.

(10) Patent No.: US 10,179,524 B1
(45) Date of Patent: Jan. 15, 2019

(54) LATCH TO ATTACH SEATBACK TO REAR WALL OF VEHICLE

(71) Applicant: Ford Global Technologies, LLC, Dearborn, MI (US)

(72) Inventors: Mark Caye, Allen Park, MI (US); Glenn Scott, Dexter, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/651,481

(22) Filed: Jul. 17, 2017

(51) Int. Cl.
  *B60N 2/36* (2006.01)
  *B60N 2/68* (2006.01)
  *B60N 2/64* (2006.01)

(52) U.S. Cl.
  CPC ........... *B60N 2/366* (2013.01); *B60N 2/68* (2013.01); *B60N 2/64* (2013.01)

(58) Field of Classification Search
  CPC ... B60N 2/36; B60N 2/68; B60N 2/64; B60N 2/682
  USPC ............................................ 296/65.02, 65.03
  See application file for complete search history.

(56) References Cited

U.S. PATENT DOCUMENTS

| | | | | | |
|---|---|---|---|---|---|
| 4,971,380 | A | * | 11/1990 | Cote | B60N 2/682 248/301 |
| 4,991,907 | A | * | 2/1991 | Tanaka | B60N 2/85 297/408 |
| 5,156,442 | A | * | 10/1992 | Courtois | B60N 2/00 297/440.15 |
| 5,251,962 | A | * | 10/1993 | Saito | B60N 2/5825 297/219.1 |
| D346,951 | S | * | 5/1994 | Oberson | D8/367 |
| 6,116,677 | A | * | 9/2000 | Gac | B60N 2/58 296/190.09 |
| 6,948,778 | B1 | * | 9/2005 | Jaradat | A47C 9/06 296/65.03 |
| 7,510,228 | B2 | * | 3/2009 | Ito | B60N 2/0232 296/65.17 |
| 7,568,764 | B2 | * | 8/2009 | Harper | B60N 2/045 297/14 |
| 8,303,018 | B2 | | 11/2012 | Zambon et al. | |
| 2013/0049425 | A1 | | 2/2013 | Runde et al. | |

* cited by examiner

*Primary Examiner* — Pinel E Romain
(74) *Attorney, Agent, or Firm* — Vichit Chea; Price Heneveld LLP

(57) ABSTRACT

A latch to latch a seatback to a frame of a vehicle comprises: a first seatback attachment portion; a first extended portion connected to the first seatback attachment portion that extends generally rearward from the first seatback attachment portion; a first interface portion connected to the first extended portion at a first bend that extends at an angle downward and forward from the first bend; and a retainer portion connected to the first interface portion at a bend forming a first retaining lip. The latch can further comprise a second seatback attachment portion and a second extended portion connected to the second seatback attachment portion that extends generally rearward from the second seatback attachment portion. The latch can further comprise a second interface portion connected to the second extended portion at a second bend that extends at an angle upward and forward from the second bend.

20 Claims, 19 Drawing Sheets

LATCH TO ATTACH SEATBACK TO REAR WALL OF VEHICLE

FIELD OF THE INVENTION

The present invention generally relates to the attachment of a seatback of a seating assembly to a frame of a vehicle.

BACKGROUND OF THE INVENTION

Some types of vehicles, such as a pickup, configure the location of a seating assembly such that the seatback of the seating assembly is positioned adjacent a rear wall portion of a frame of the vehicle. The seatback is sometimes latched to the rear wall portion.

SUMMARY OF THE INVENTION

According to a first aspect of the present invention, a latch to latch a seatback to a frame of a vehicle comprises: a first seatback attachment portion; a first extended portion connected to the first seatback attachment portion that extends generally rearward from the first seatback attachment portion; a first interface portion connected to the first extended portion at a first bend that extends at an angle downward and forward from the first bend; and a retainer portion connected to the first interface portion at a bend forming a first retaining lip.

Embodiments of the first aspect of the invention can include any one or a combination of the following features:
- a second seatback attachment portion and a second extended portion connected to the second seatback attachment portion that extends generally rearward from the second seatback attachment portion;
- a second interface portion connected to the second extended portion at a second bend that extends at an angle upward and forward from the second bend;
- the retainer portion is connected to the second interface portion at a bend forming a second retaining lip;
- the retainer portion forms a retaining channel;
- the first retaining lip is adjacent the second retaining lip;
- a one-way stop connected to the first interface portion that extends at an angle more toward the second retaining lip than the first retaining lip;
- a release element interconnected with the one-way stop;
- the release element includes a loop portion, the first extended portion includes an aperture, and the release element extends through the aperture and terminates with the loop portion;
- a stamped metal portion having a thickness between 0.5 mm and 1.0 mm;
- the stamped metal portion is spring steel; and
- the first seatback attachment portion is parallel to the second seatback attachment portion.

According to a second aspect of the present invention, a vehicle comprises: a frame including a rear wall portion; a laterally extended rod mounted upon the rear wall portion; a seatback pivotally attached to the vehicle at a seatback pivot, the seatback comprising a latch, the latch comprising a first seatback attachment portion, a first extended portion connected to the first seatback attachment portion that extends generally rearward from the first seatback attachment portion, a first interface portion connected to the first extended portion at a first bend that extends at an angle downward and forward from the first bend, and a retainer portion connected to the first interface portion at a bend forming a first retaining lip; wherein the seatback is capable of moving from a first position, wherein the seatback is pivoted away from the rear wall portion and the retainer portion does not surround the laterally extended rod, to a second position, wherein the seatback is pivoted toward the rear wall portion and the retainer portion at least partially surrounds the laterally extended rod.

Embodiments of the second aspect of the invention can include any one or a combination of the following features:
- as the seatback moves from the first position to the second position, the laterally extended rod contacts and deflects the first interface portion before the retainer portion at least partially surrounds the laterally extended rod;
- the retainer portion connects with a second interface portion at a bend forming a second retaining lip that is adjacent the first retaining lip;
- the retainer portion forms a retaining channel;
- in the second position, the laterally extended rod is within the retaining channel;
- as the seatback moves from the first position to the second position, the laterally extended rod causes the first retaining lip and the second retaining lip to move apart until the first retaining lip and the second retaining lip are forced over the laterally extended rod as the laterally extended rod slides into the retaining channel, at which point the first retaining lip and the second retaining lip move closer together;
- a one-way stop connected to the first interface portion that extends through a first opening in the first interface portion at a greater downward angle than the first interface portion extends from the first bend;
- as the seatback moves from the first position to the second position, the one-way stop slides over the laterally extended rod;
- when the seatback is in the second position, the one-way stop prevents the latch from disengaging with the laterally extended rod when a force is applied to the seatback away from the rear wall portion and the seatback cannot move back to the first position;
- a line interconnected to the one-way stop, the line including a loop portion; and
- when the line is pulled, the one-way stop no longer prevents the latch from disengaging with the laterally extended rod when a force is applied to the seatback away from the rear wall portion and the seatback can move back to the first position.

According to a third aspect of the present invention, a vehicle comprises: a frame including a rear wall portion comprising a rod having a radius; and a seatback pivotally attached to the vehicle at a seatback pivot, the seatback comprising a latch, the latch comprising opposing surfaces, the distance between which narrows from a value greater than the twice the radius of the rod to a value less than twice the radius of the rod, and a retaining channel to retain the rod.

Embodiments of the third aspect of the invention can include any one or a combination of the following features:
- the seatback further comprising a latched position and an unlatched position;
- in the latched position, the retaining channel retains the rod;
- in the unlatched position, the retaining channel does not retain the rod;
- as the seatback moves from the unlatched position to the latched position, the rod pushes the opposing surfaces apart and subsequently the rod enters the retaining channel, thereafter the opposing surfaces come closer together; and the latch further comprises a tab that moves into a blocking position that prevents the seatback from moving to the unlatched position after the rod has entered the retaining channel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
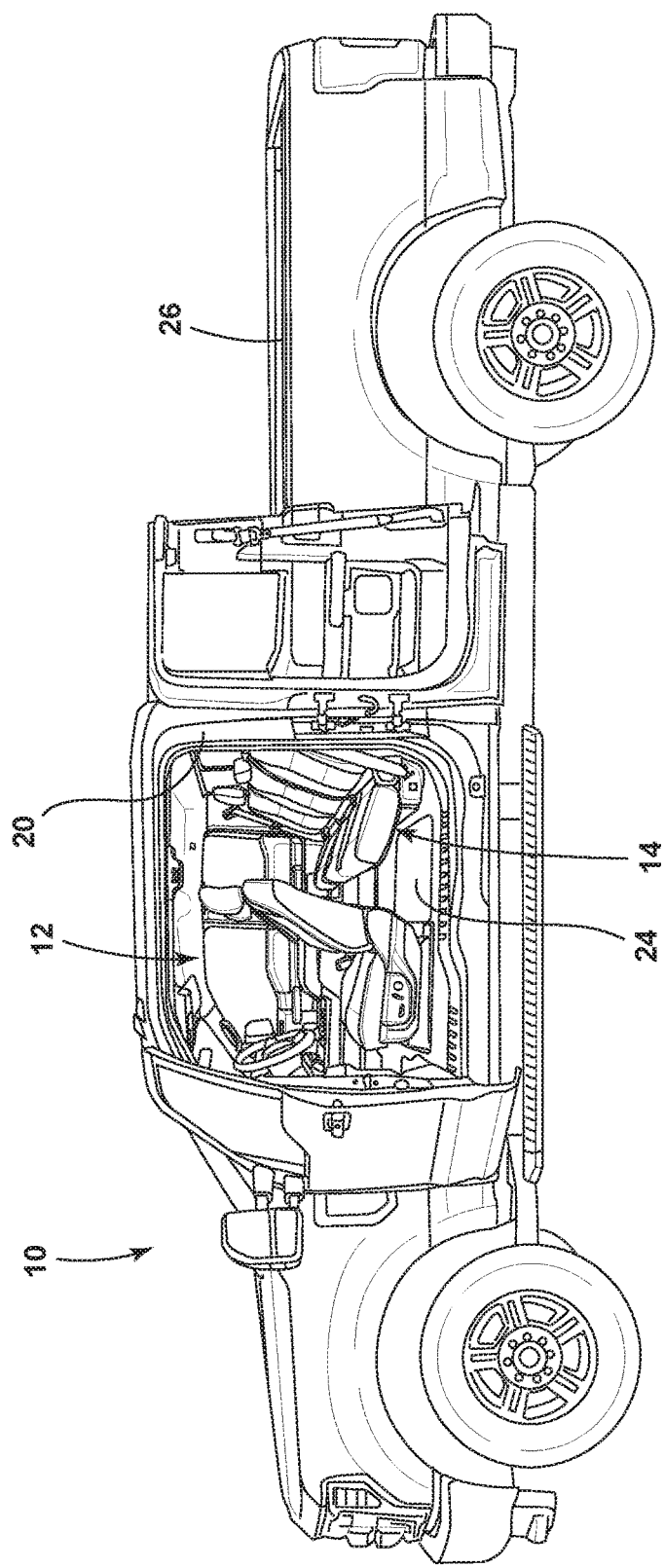
FIG. 1 is a side view of a vehicle illustrating a rear seating assembly in the interior in front of a cargo bed 26.
Figure 2:
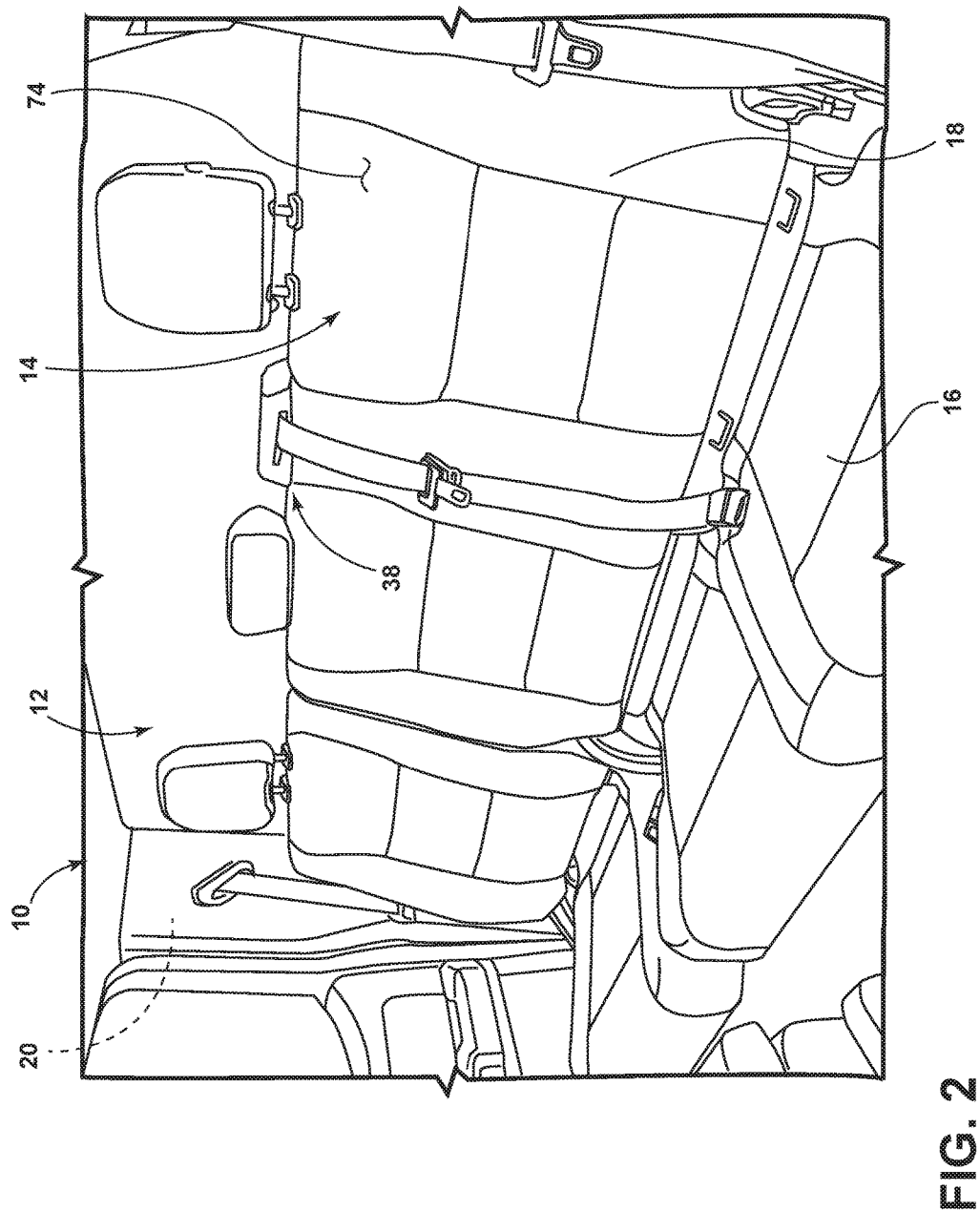
FIG. 2 is a perspective view of the interior of the vehicle of FIG. 1, illustrating a seatback of the rear seating assembly in a second position (latched) to a rear wall portion of a frame of the vehicle.
Figure 3:
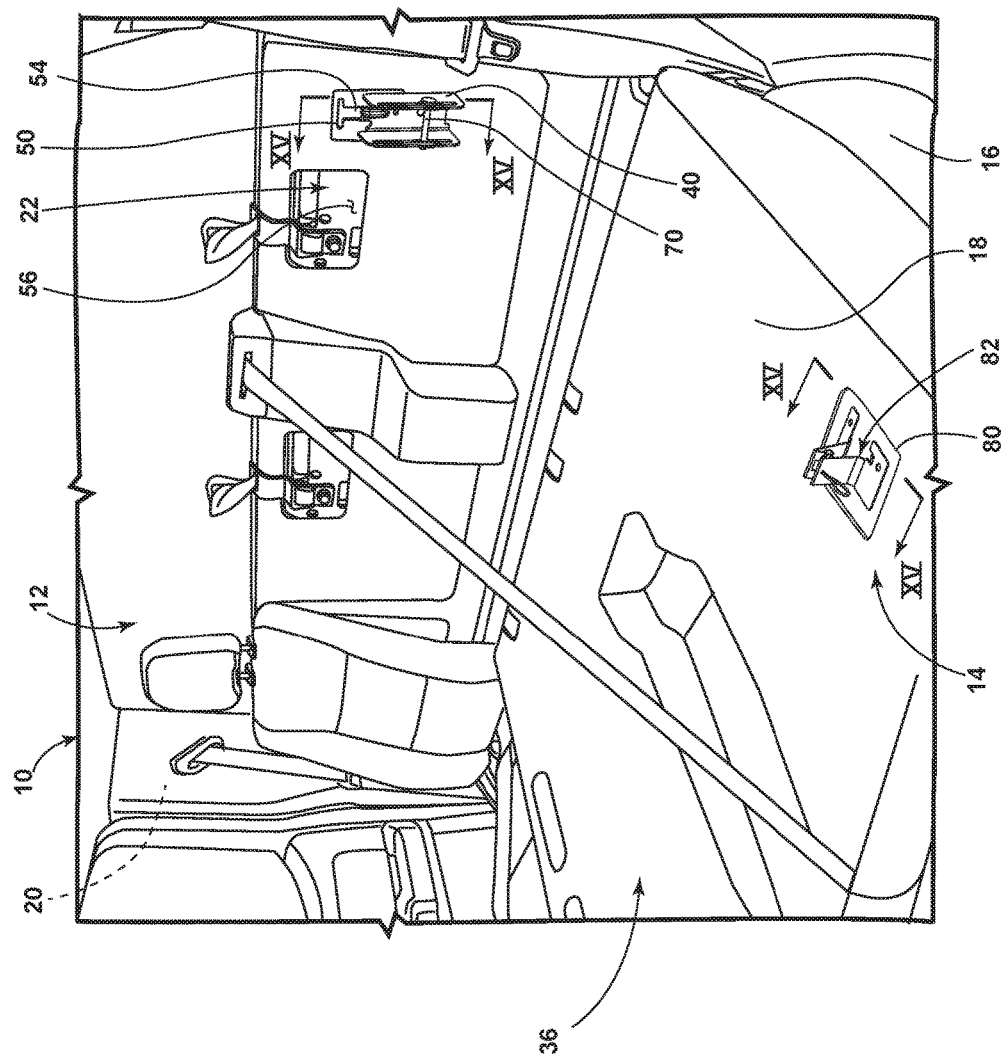
FIG. 3 is a perspective view of the interior of the vehicle of FIG. 1, illustrating the seatback in a first position, with a latch attached to the seatback unlatched from a mounting bracket attached to the rear wall.
Figure 4:
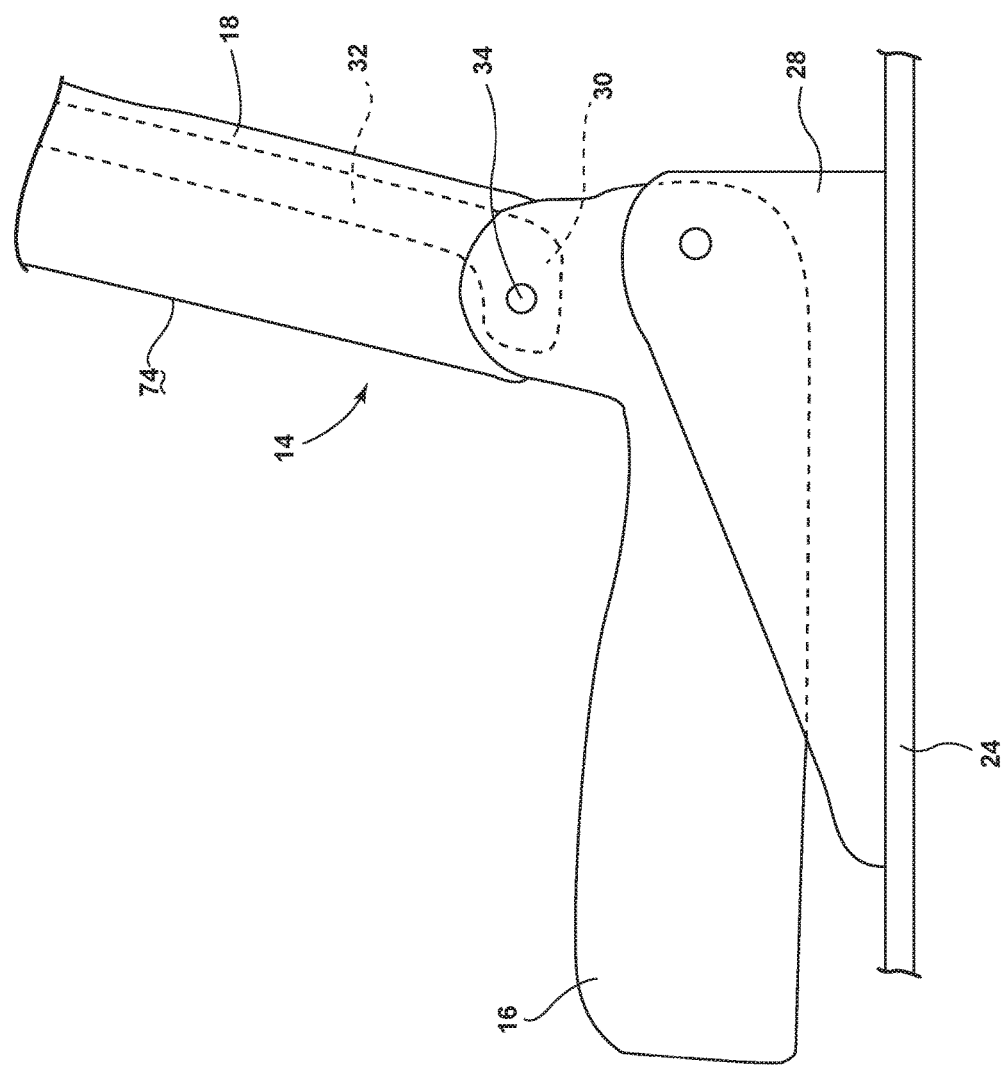
FIG. 4 is a side schematic view of the rear seating assembly of FIG. 1, illustrating the seatback pivotally attached to a seat at a seatback pivot 34.

For purposes of description herein, the terms "upper," "lower," "right," "left," "rear," "front," "vertical," "horizontal," and derivatives thereof shall relate to the disclosure as oriented in FIGS. 1 and 15-19. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, a vehicle 10 includes an interior 12 and one or more rear seating assemblies 14 in the interior 12. The rear seating assembly 14 includes a seat 16 and a seatback 18. The vehicle 10 includes a frame 20 that provides structural support for the vehicle 10. The frame 20 includes a rear wall portion 22 and a floor pan portion 24. The rear wall portion 22 is located behind the rear seating assembly 14 and, more specifically, behind the seatback 18 of the rear seating assembly 14. The vehicle 10 can be a car, a truck, including a pick-up truck as illustrated, or a van, among other things. In a pick-up truck, the rear wall portion 22 of the frame 20 is between the rear seating assembly 14 and a cargo bed 26.

The seat 16 is attached to the frame 20. In the embodiment illustrated, a seat bracket 28 is attached to the floor pan portion 24 of the frame 20. In turn, the seat 16 is pivotally attached to the seat bracket 28. The seat 16 need not be pivotally attached, however. The seat 16 includes a seatback mounting portion 30, to which an end vertical support 32 within the seatback 18 is pivotally attached at a seatback pivot 34. The seatback 18 can move from a first position 36 (see FIG. 3), where the seatback 18 is unlatched from the rear wall portion 22 and pivoted over the seat 16, to a second position 38 (see FIG. 2), where the seatback 18 is latched (as explained below) to the rear wall portion 22. In other words, to move from the first position 36 (unlatched) to the second position 38 (latched), the seatback 18 is pivoted toward the rear wall portion 22. To move from the second position 38

(latched) to the first position 36 (unlatched), the seatback 18 is pivoted away from the rear wall portion 22.

Figure 5:
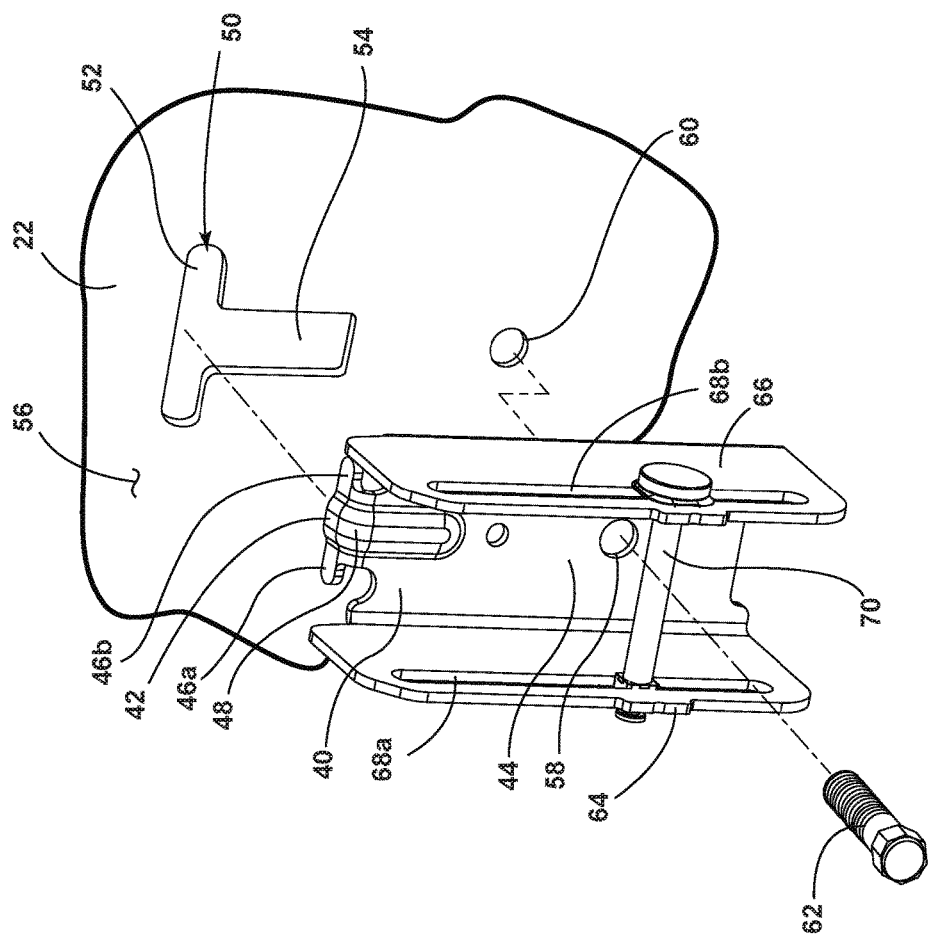
FIG. 5 is a perspective blown-up view illustrating how the mounting bracket of FIG. 3, which includes a laterally extended rod, attaches to the rear wall portion.
Figure 6:
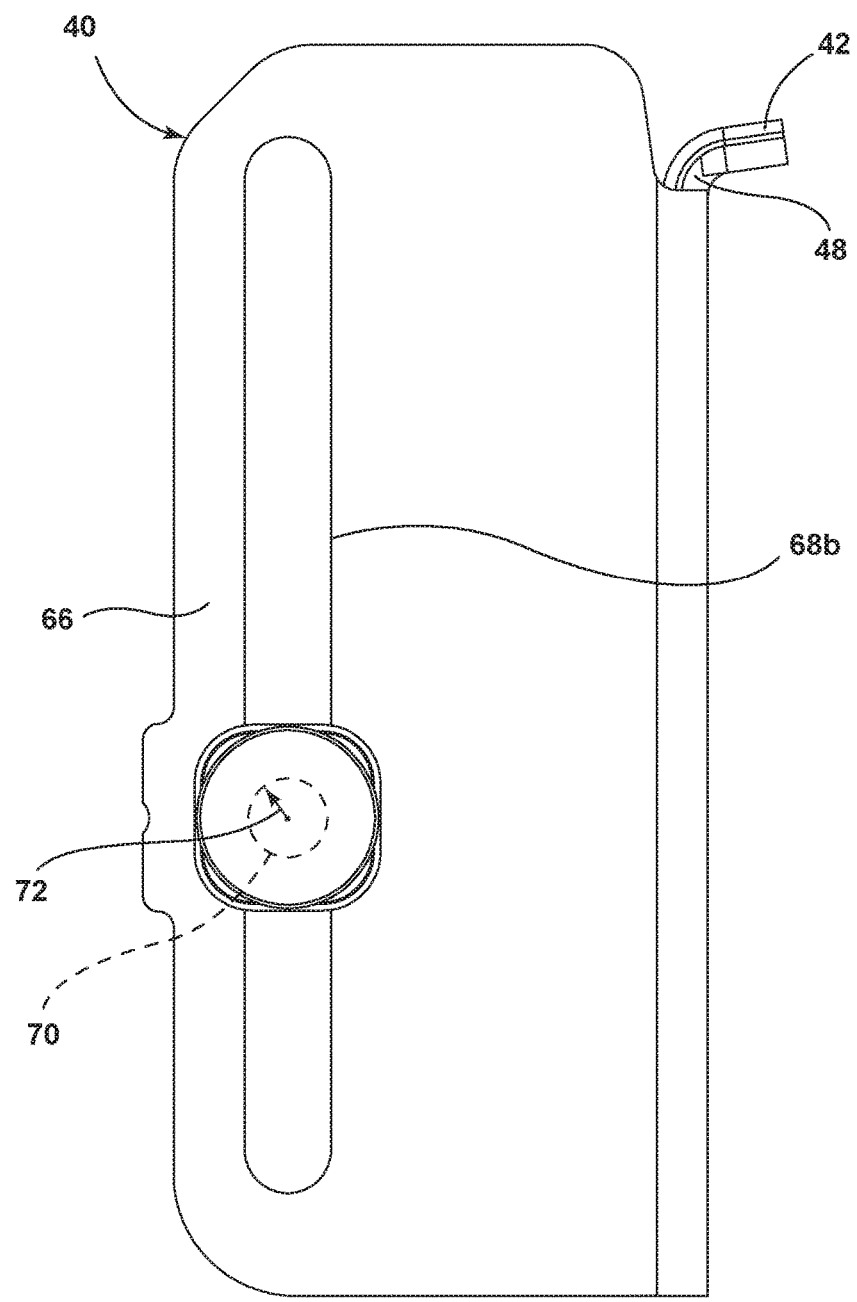
FIG. 6 is a side view of the mounting bracket of FIG. 3, illustrating an insertion flange with a neck and a radius of the laterally extended rod.
Figure 7:
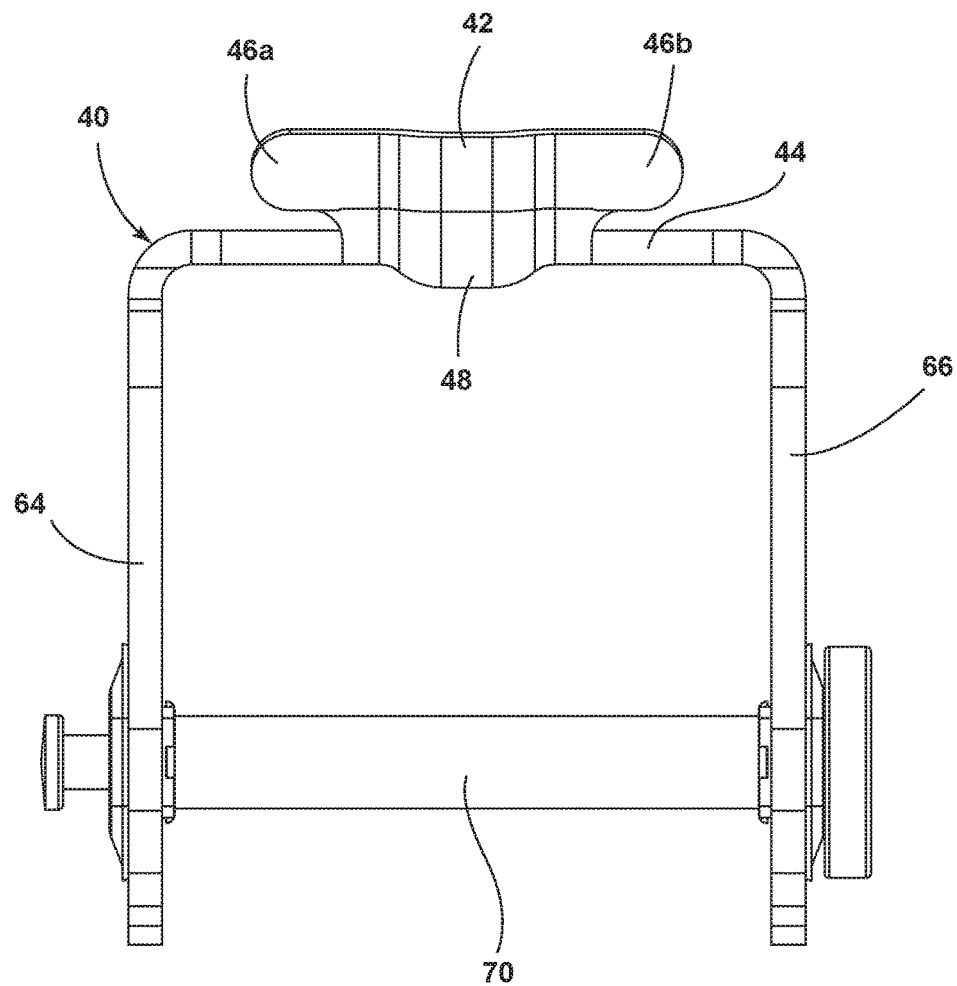
FIG. 7 is a top view of the mounting bracket of FIG. 3, illustrating a first forward extending portion and a second forward extending portion holding the laterally extended rod.

Referring to FIGS. 5-7, a mounting bracket 40 is attached to the rear wall portion 22. The mounting bracket 40 includes an insertion flange 42, which extends orthogonally rearward from a middle section 44. The insertion flange 42 includes a pair of wings 46a and 46b extending laterally from a narrower neck 48. The rear wall portion 22 includes a slot 50 with a wide portion 52 above a narrow portion 54. The insertion flange 42 of the mounting bracket 40 is slotted into the slot 50 at the wide portion 52 and the mounting bracket 40 slides down such that the middle section 44 is flush against a flat surface 56 of the rear wall portion 22, the neck 48 extends through the narrow portion 54 of the rear wall portion 22, and the pair of wings 46a, 46b are behind the rear wall portion 22. The mounting bracket 40 and the rear wall portion 22 both include matching apertures 58 and 60, respectively, through which a fastener 62 is inserted to attach the mounting bracket 40 to the rear wall portion 22.

The mounting bracket 40 further includes a first forward extending portion 64 and second forward extending portion 66 opposite the first forward extending portion 64, with the middle section 44 in between. The first forward extending portion 64 and the second forward extending portion 66 each extend orthogonally forward from the middle section 44 (forward as in the toward the forward end, i.e., the front, of the vehicle). Both the first forward extending portion 64 and the second forward extending portion 66 have a slot 68a, 68b, respectively.

The mounting bracket 40 supports a laterally extended rod 70. The mounting bracket 40 holds the laterally extended rod 70 in place within the slots 68a, 68b. In some embodiments, the laterally extended rod 70 is capable of sliding vertically within the slots 68a, 68b, such as when the seat 16 is pivotable relative to the seat bracket 28. In such an embodiment, pivoting the seat 16 up also pushes the seatback 18 upward and thus the laterally extended rod 70, when the seatback 18 is attached to the laterally extended rod 70, as discussed below. The horizontal axis (not shown) of the laterally extended rod 70 is parallel to the flat surface 56 of the rear wall portion 22 to which the mounting bracket 40 is attached. The laterally extended rod 70 has a radius 72 (see FIG. 6).

Figure 8:
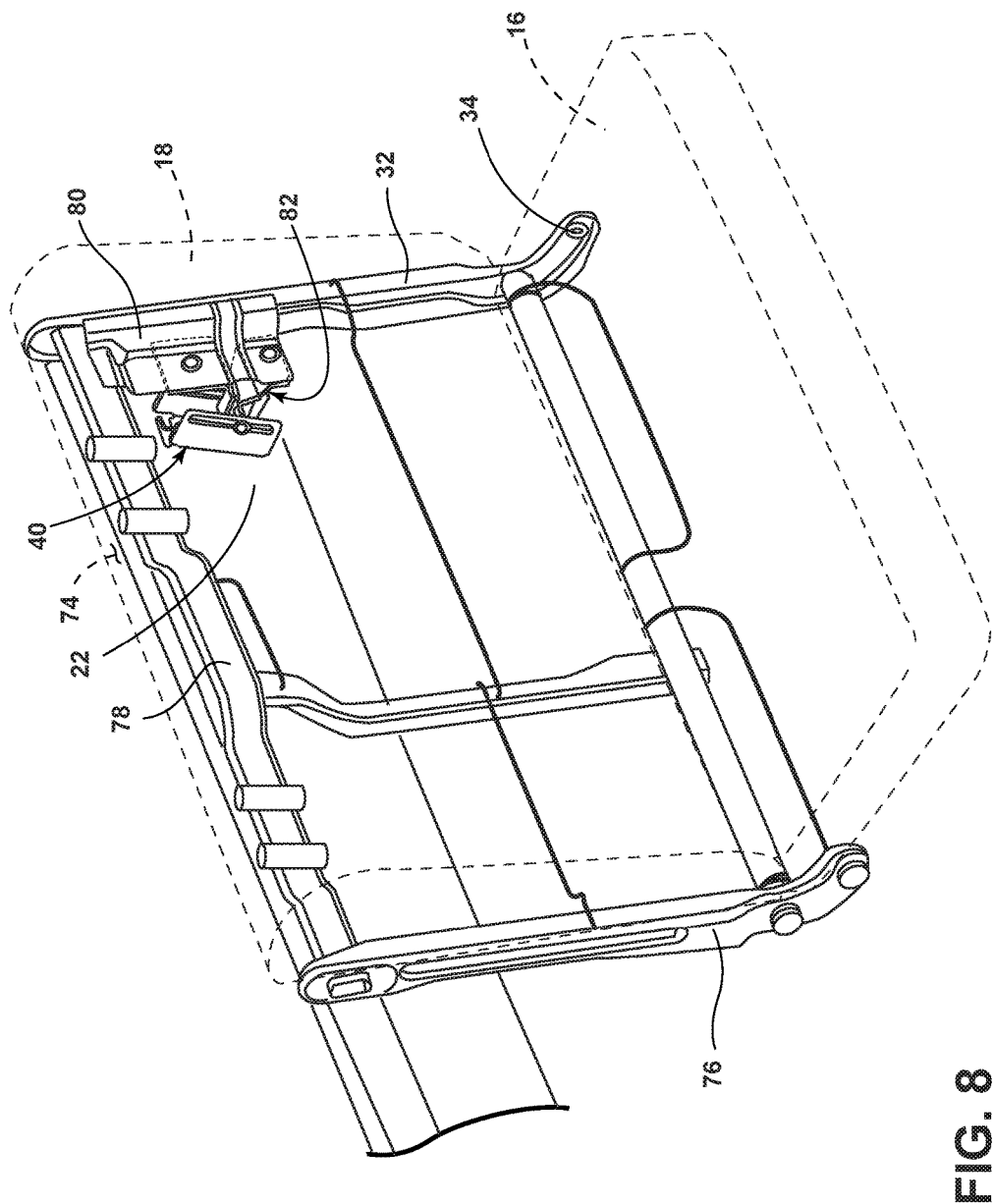
FIG. 8 is a perspective view of the seatback of FIG. 2 in the second position, illustrating the latch connected to the seatback and latched to the mounting bracket.
Figure 9:
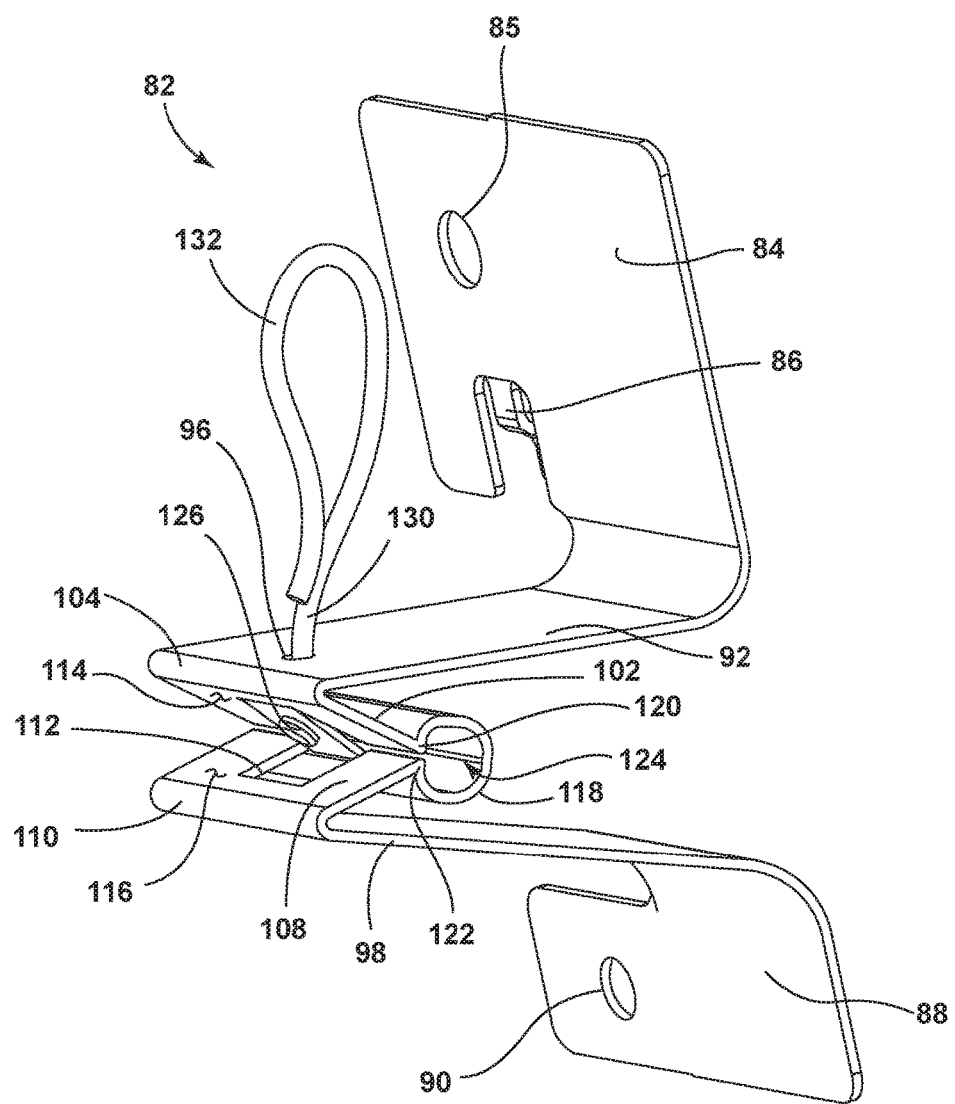
FIG. 9 is a perspective view of the latch of FIG. 8, illustrating a retainer portion forming a retaining channel to retain the laterally extended rod of the mounting bracket of FIG. 3.
Figure 10:
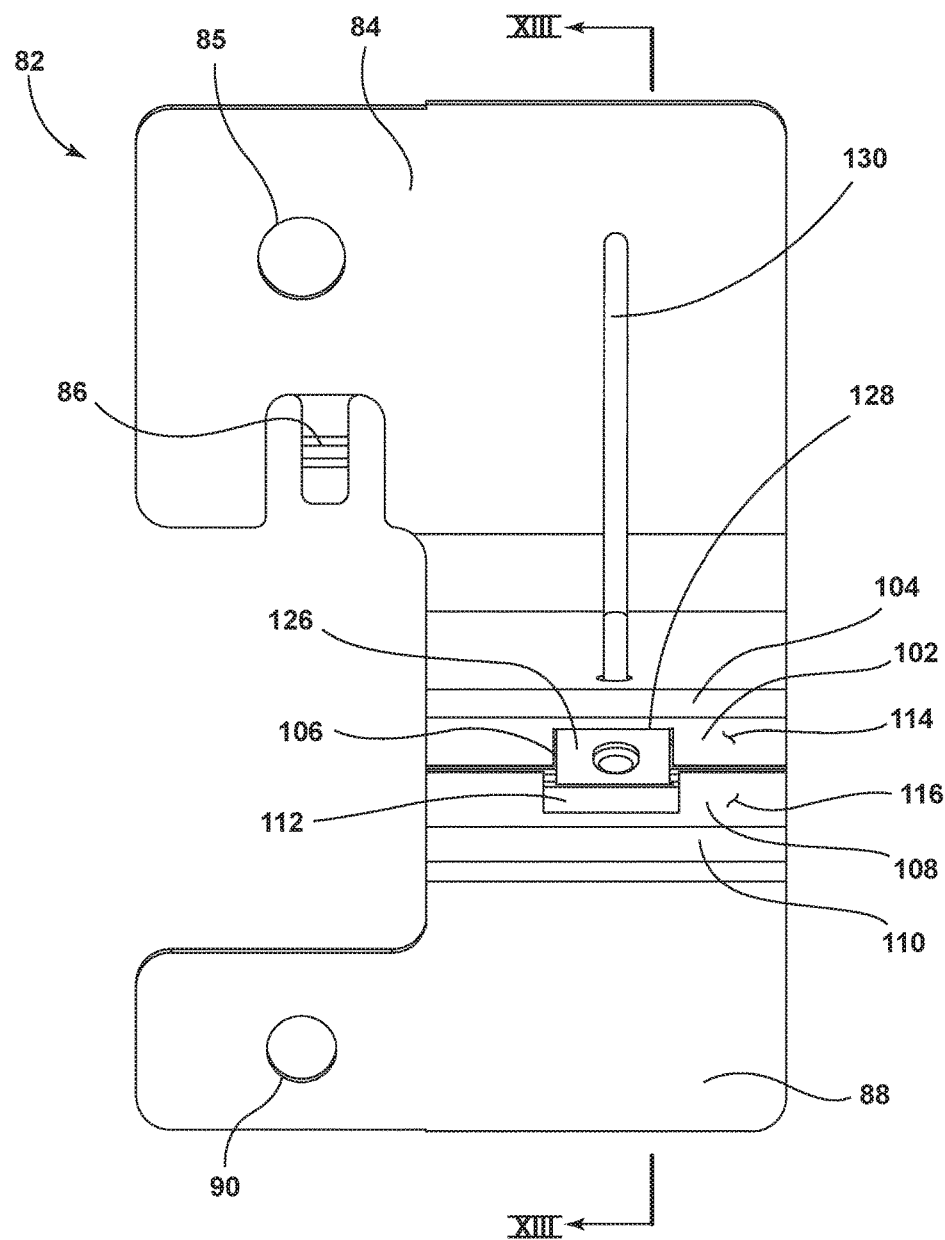
FIG. 10 is a front view of the latch of FIG. 8 not attached to the seatback, illustrating a one-way stop and a release element to manipulate the one-way stop.
Figure 11:
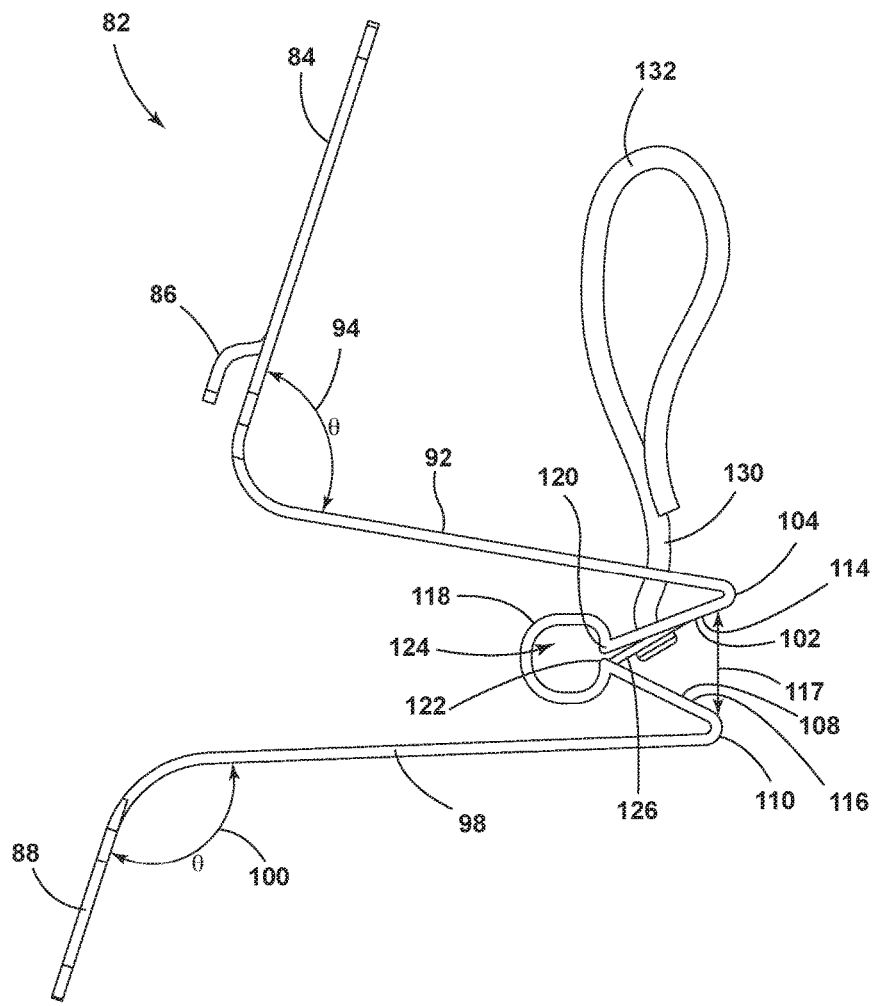
FIG. 11 is a side view of the latch of FIG. 8 not attached to the seatback, illustrating a first extended portion extending at an angle away from a first seatback attachment portion.
Figure 12:
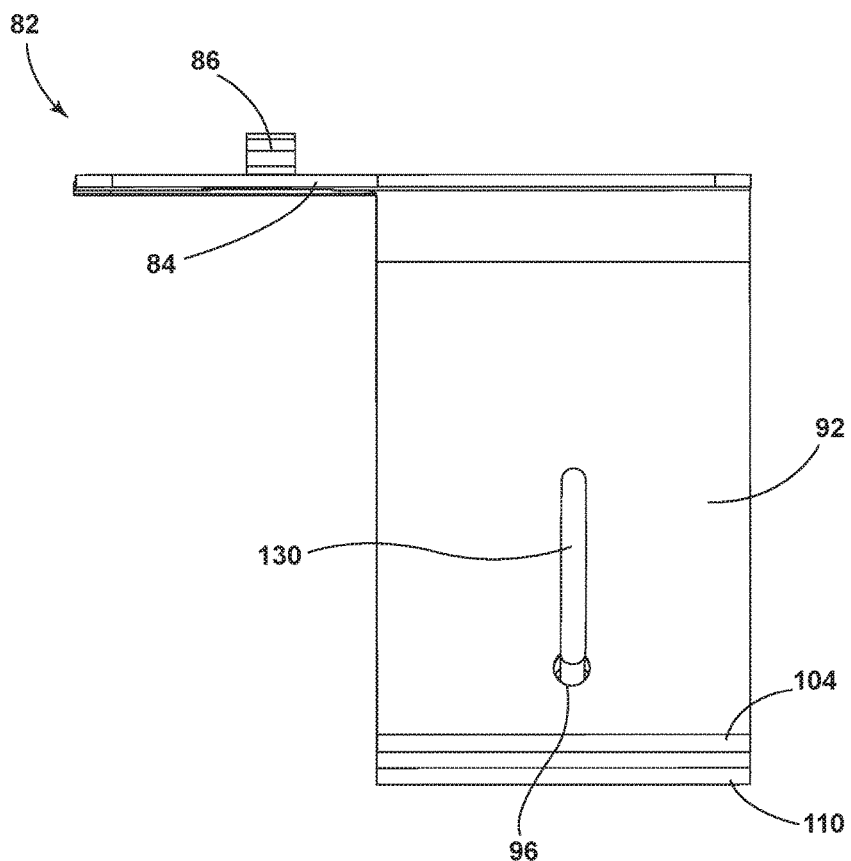
FIG. 12 is a top view of the latch of FIG. 8 not attached to the seatback, illustrating the release element extending through an aperture in the first extended portion.
Figure 13:
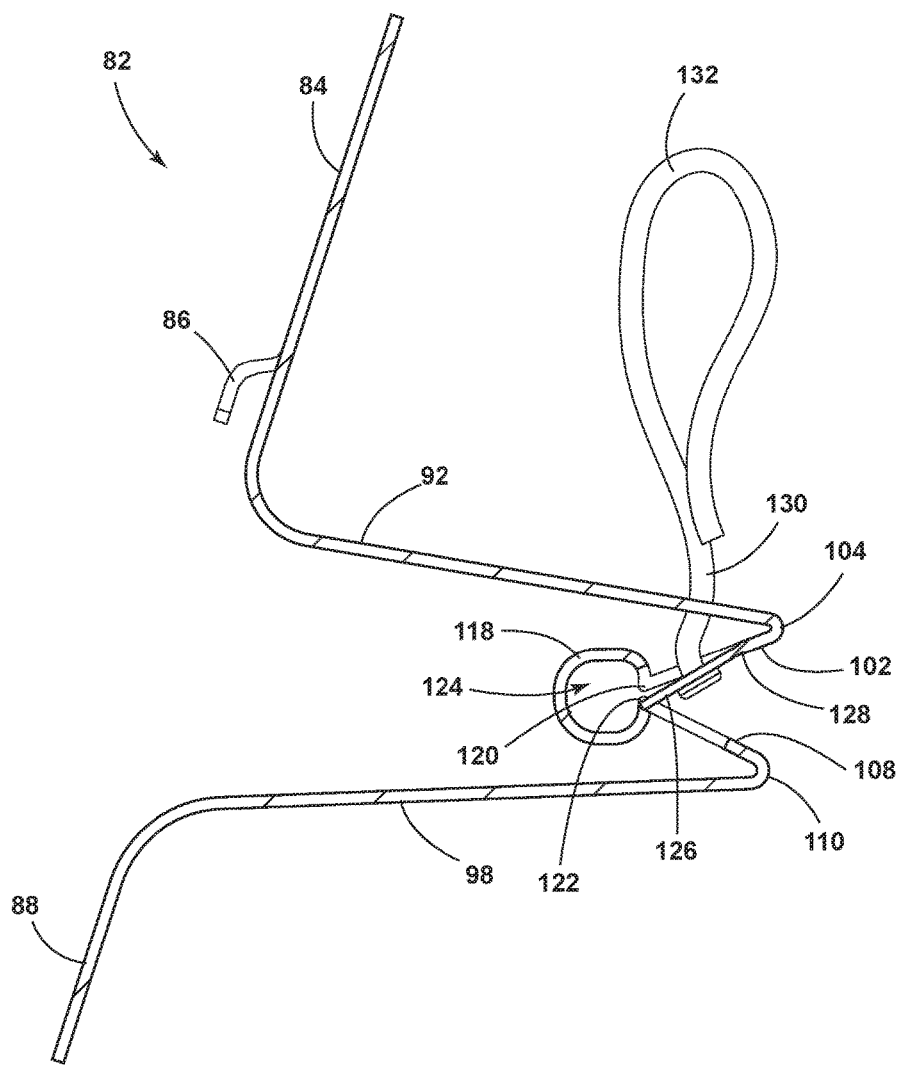
FIG. 13 is a cross-sectional side view of the latch of FIG. 8 taken through line XIII-XIII of FIG. 10, illustrating the one-way tab extending from a first interface portion at a bend.

Referring to FIG. 8, in addition to the end vertical support 32, the seatback 18 includes, beneath the exterior surface 74 of the seatback 18, a second vertical support arm 76, a cross member 78, and a carrier 80. The exterior surface 74 is typically a cloth or leather. The second vertical support arm 76, like the end vertical support 32, provides vertical support for other components of the seatback 18. The cross member 78 similarly provides horizontal support. The carrier 80 is interconnected with the end vertical support 32 and the cross member 78. The carrier 80 provides interconnection opportunities for components of the seatback 18, such as a latch 82, discussed below.

Referring to FIGS. 9-13, the latch 82 includes a first seatback attachment portion 84. The first seatback attachment portion 84, in this embodiment, is generally flat with an aperture 85 to provide the ability to attach the latch 82 to the carrier 80, as discussed below. The first seatback attachment portion 84 additionally includes a tab 86 that assists in mounting the latch 82 to the carrier 80, as discussed below.

The latch 82 further includes a second seatback attachment portion 88. The second seatback attachment portion 88, in this embodiment, is likewise generally flat with an aperture 90 to provide the ability to further attach the latch 82 to the carrier 80, as discussed below. The second seatback attachment portion 88 is parallel to, and planar with, the first seatback attachment portion 84. The second seatback attachment portion 88 is on the opposite side of the latch 82 as the first seatback attachment portion 84.

The latch 82 further includes a first extended portion 92 connected to the first seatback attachment portion 84. The first extended portion 92 extends away from the first seatback attachment portion 84, generally rearward from the seatback 18 and the first seatback attachment portion 84 when the latch 82 is attached to the seatback 18 and the seatback 18 is in the second position 38 (latched position, as in FIG. 2). The first extended portion 92 disposes the portions of the latch 82, discussed below, that engage with the laterally extended rod 70, closer to the laterally extended rod 70. The first extended portion 92 may extend at an angle 94 that is a right or slightly acute angle away from the first seatback attachment portion 84 (see FIG. 11). The first extended portion 92 includes an aperture 96, which is discussed further below.

The latch 82 further includes a second extended portion 98 connected to the second seatback attachment portion 88. The second extended portion 98 extends away from the second seatback attachment portion 88, generally rearward from the seatback 18 and the second seatback attachment portion 88 when the latch 82 is attached to the seatback 18 and the seatback 18 is in the second position 38 (latched position). The second extended portion 98 also disposes the portions of the latch 82, discussed below, that engage with the laterally extended rod 70, closer to the laterally extended rod 70. The second extended portion 98 may extend at an angle 100 that is an obtuse angle away from the second seatback attachment portion 88.

The latch 82 further includes a first interface portion 102 connected to the first extended portion 92. The first interface portion 102 is connected to the first extended portion 92 at a first bend 104, which, in this embodiment, is a large obtuse angle bend, such that the first interface portion 102 extends at an angle downward and forward from the first bend 104 in the general direction of the second seatback attachment portion 88. As discussed below, the first interface portion 102 interacts with the laterally extended rod 70 when the seatback 18 moves from first position 36 (unlatched position) to the second position 38 (latched position). The first interface portion 102, in this embodiment, includes a centrally located first opening 106, the point of which is discussed below.

The latch 82 further includes a second interface portion 108 connected to the second extended portion 98. The second interface portion 108 is connected to the second extended portion 98 at a second bend 110, which, in this embodiment, is a large obtuse angle bend, such that the second interface portion 108 extends at an angle upward and forward from the second bend 110 in the general direction of the first seatback attachment portion 84. As discussed below, the second interface portion 108 interacts with the laterally extended rod 70 when the seatback 18 moves from the first position 36 (unlatched position) to the second position 38 (latched position). The second interface portion 108, in this embodiment, includes a centrally located second opening 112. In this embodiment, the width of the second opening 112, in a direction parallel to the second bend 110, is wider than the width in the first opening 106 in the same direction (see FIG. 10).

The first interface portion 102 and the second interface portion 108 form opposing surfaces 114 and 116 respectively. The distance 117 (such as a distance that is parallel to a line tangential to both the first bend and the second bend)

between the opposing surfaces 114, 116 narrows, moving toward a retaining channel 124 (discussed below) and away from the first bend 104 and the second bend 110, form a value greater than twice the radius 72 of the laterally extended rod 70 to a value less than twice the radius 72 of the laterally extended rod 70.

The latch 82 further includes a retainer portion 118 connected to the first interface portion 102 at a bend, which can be an obtuse angle bend, forming a first retaining lip 120. The retainer portion 118 is additionally connected to the second interface portion 108 at a bend, which can be an obtuse angle bend, forming a second retaining lip 122. The retainer portion 118 forms the retaining channel 124, to receive and retain the laterally extended rod 70, as explained below. The first retaining lip 120 is adjacent to and opposes the second retaining lip 122. As the laterally extended rod 70 is cylindrical, the retainer portion 118 is generally curved rendering the retaining channel 124 generally cylindrical as well.

The latch 82 further includes a one-way stop 126, which, as discussed below, does not prevent the laterally extended rod 70 from approaching the retainer portion 118 and entering the retaining channel 124 but prevents the latch 82 from disengaging from the laterally extended rod 70 after the laterally extended rod 70 enters the retaining channel 124. The one-way stop 126, in this embodiment, is a tab connected to the first interface portion 102 at a bend 128 and extends through the first opening 106 toward the second opening 112. The one-way stop 126 (tab) extends from the first interface portion 102 at a greater angle toward the second retaining lip 122 than the first retaining lip 120. In other words, the one-way stop 126 extends at a greater downward angle from the first interface portion 102 than the first interface portion 102 extends from the first bend 104.

The latch 82 further includes a release element 130 interconnected with the one-way stop 126. In the embodiment herein illustrated, the release element 130 is a line, such as braided wire. The release element 130 may include a loop portion 132, as the illustrated embodiment does, to facilitate manipulation of the release element 130. As mentioned above, the first extended portion 92 includes the aperture 96, and the release element 130 extends from the interconnection with the one-way stop 126 through the aperture 96 and terminates with the loop portion 132.

The latch 82, not including the release element 130, can be stamped metal. For example, the stamped metal can be AISI 1074/1075 high carbon spring steel. The stamped metal can have a thickness between 0.5 mm and 1.0 mm.

Figure 14:
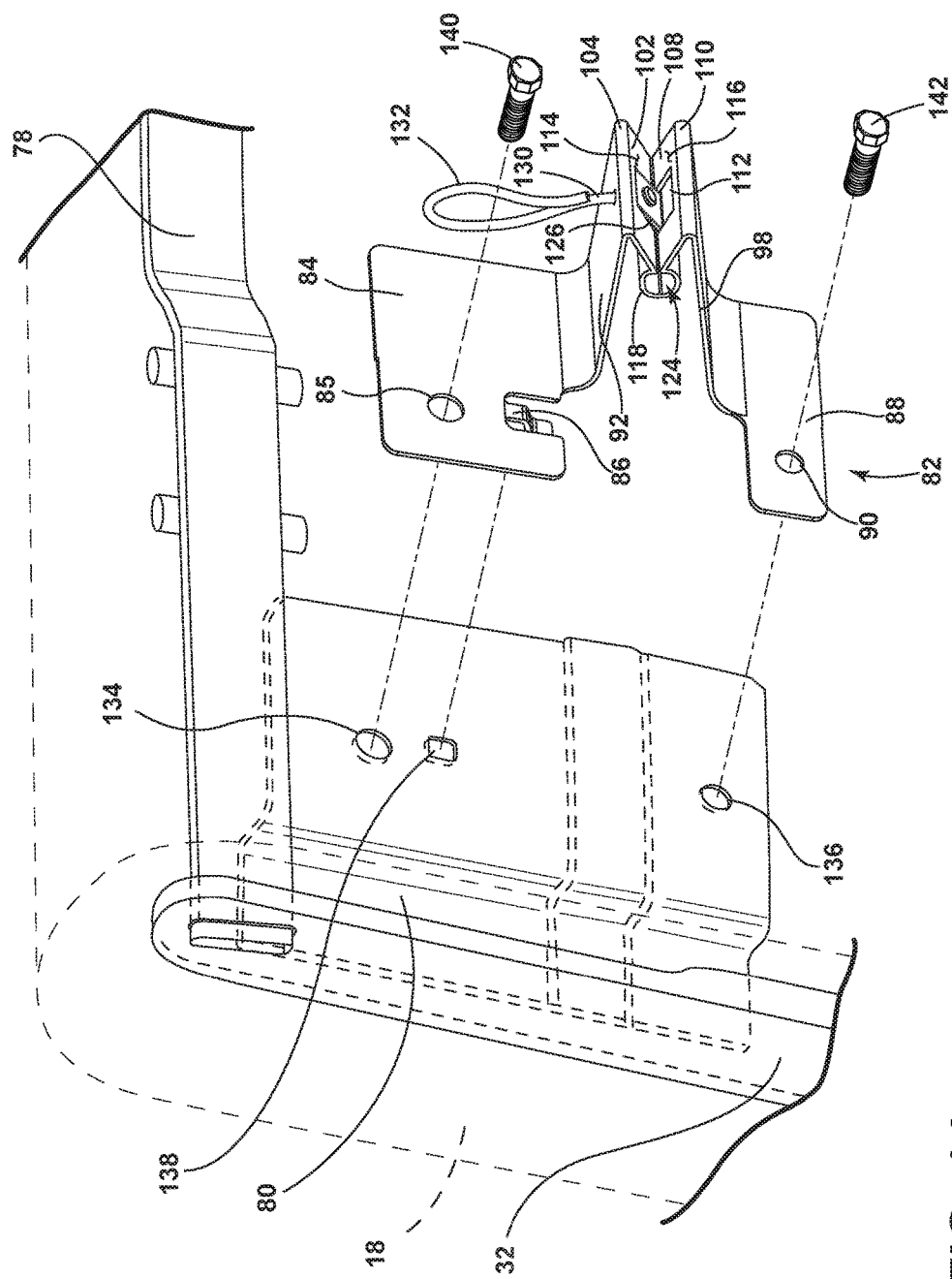
FIG. 14 is a blown-up perspective view of the latch of FIG. 8 attached to a carrier within the seatback of FIG. 2.

Referring to FIG. 14, the carrier 80 (FIG. 8) includes several apertures 134, 136 and a slot 138, which assist in mounting the latch 82 to the carrier 80 and thus the seatback 18. For example, the tab 86 of the latch 82 can be inserted in the slot 138 of the carrier 80. The tab 86 and the slot 138 help an assembler correctly position the latch 82 relative to the carrier 80. A fastener 140 can be inserted through aperture 85 of the latch 82 and matching aperture 134 of the carrier 80. Likewise, a fastener 142 can be inserted through aperture 90 of the latch 82 and matching aperture 136 of the carrier 80.

Figure 15:
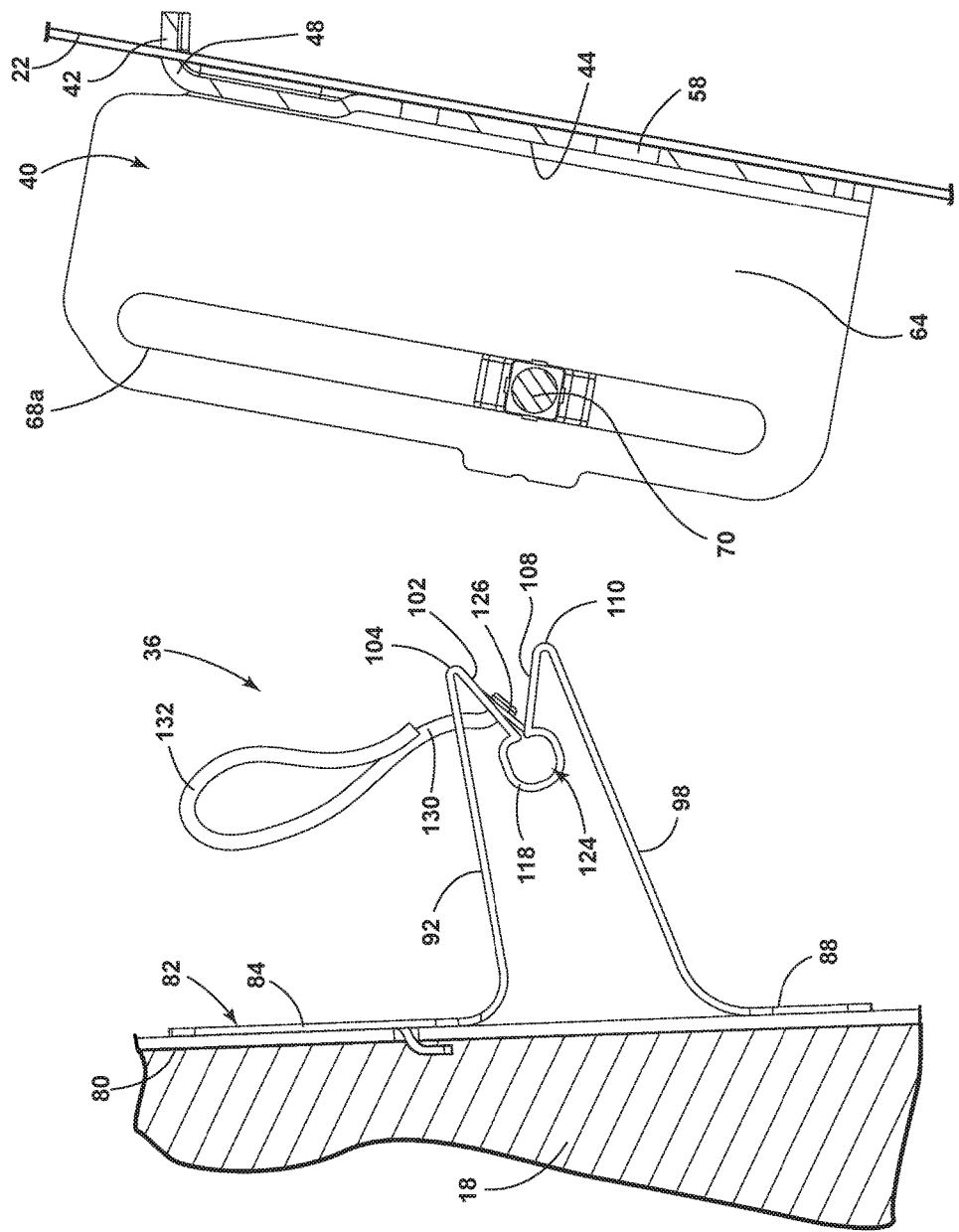
FIG. 15 is a cross-sectional side view taken through line XV-XV of FIG. 3, but with the seatback having pivoted closer to the rear wall portion, illustrating the latch of FIG. 8 attached to the seatback of FIG. 2, and the seatback in a first position still unlatched from the mounting bracket attached to the rear wall portion of FIG. 3.
Figure 16:
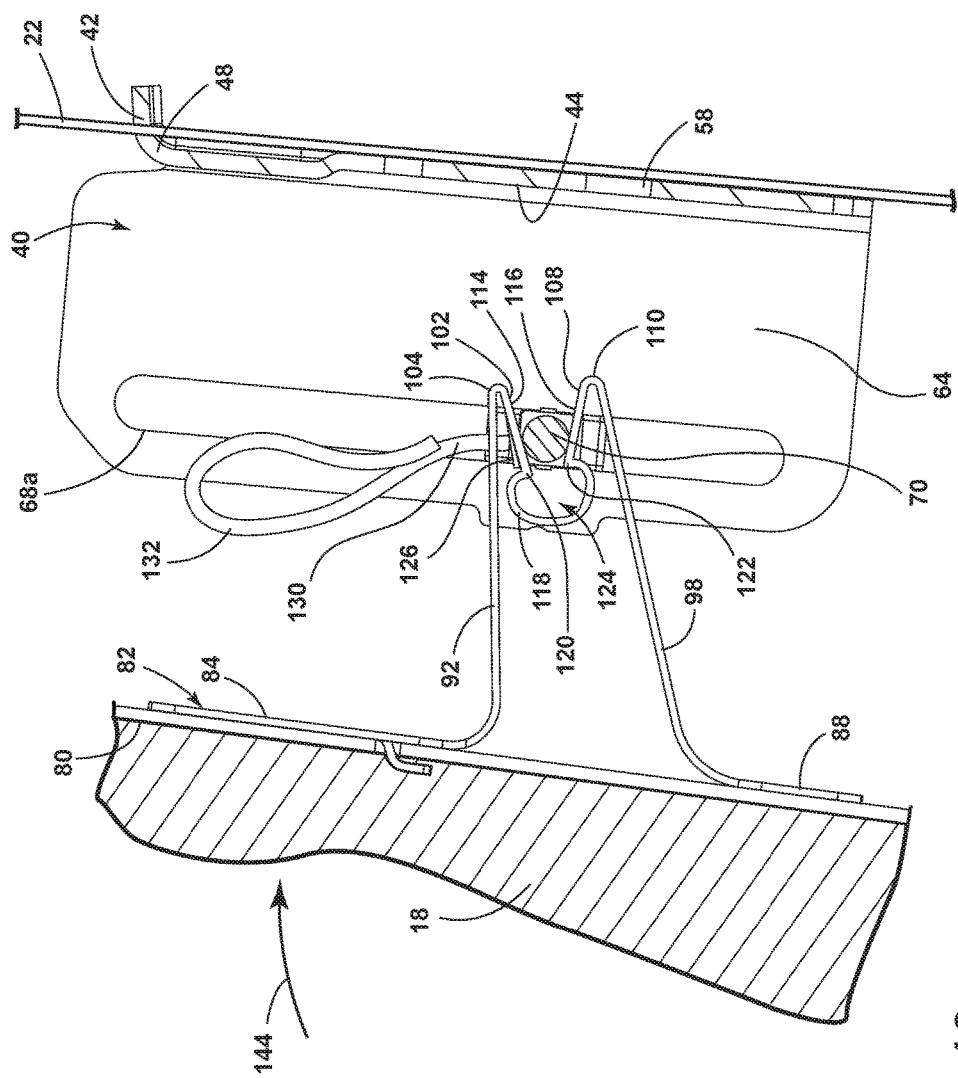
FIG. 16 is a cross-sectional side view of the latch of FIG. 8 and mounting bracket of FIG. 3, illustrating a force moving the seatback even closer toward the rear wall portion and the laterally extended rod forcing opposing surfaces of the latch away from each other.
Figure 17:
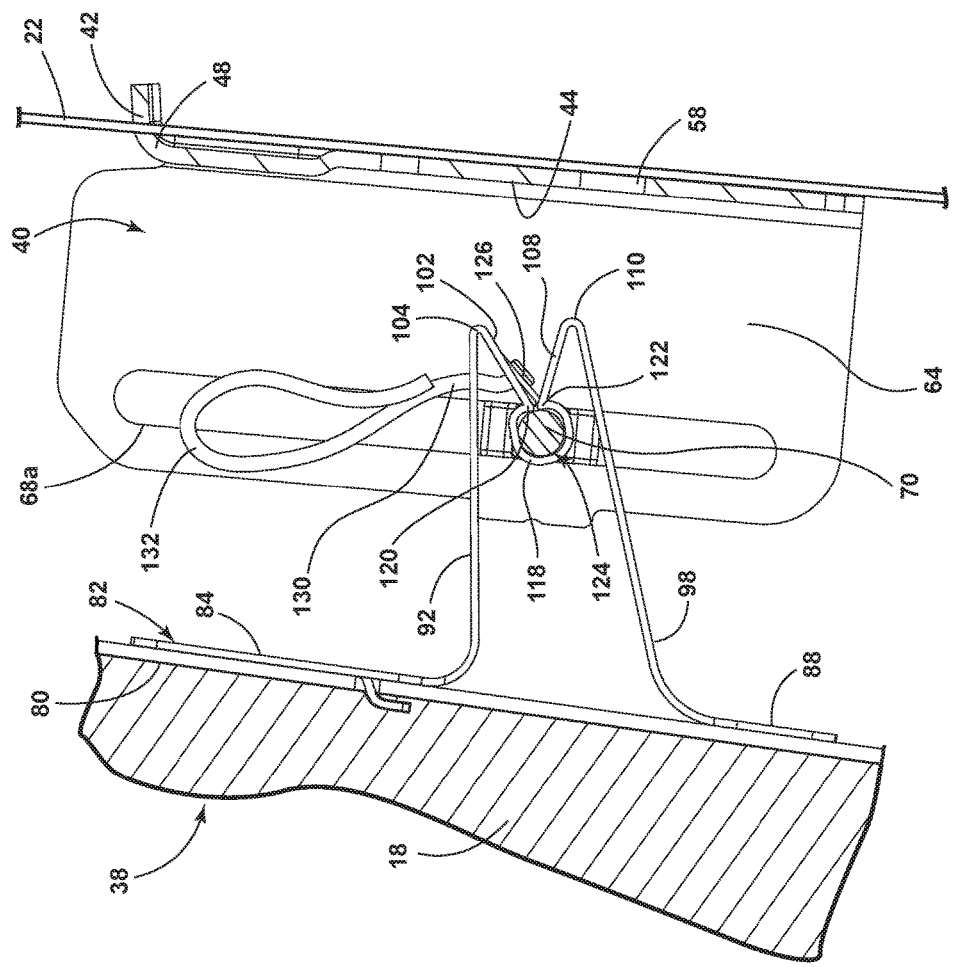
FIG. 17 is a cross-sectional side view of the latch of FIG. 8 and mounting bracket of FIG. 3, illustrating the seatback in the first position latched to the rear wall portion such that the laterally extended rod of the mounting bracket is within the retaining channel of the latch.
Figure 18:
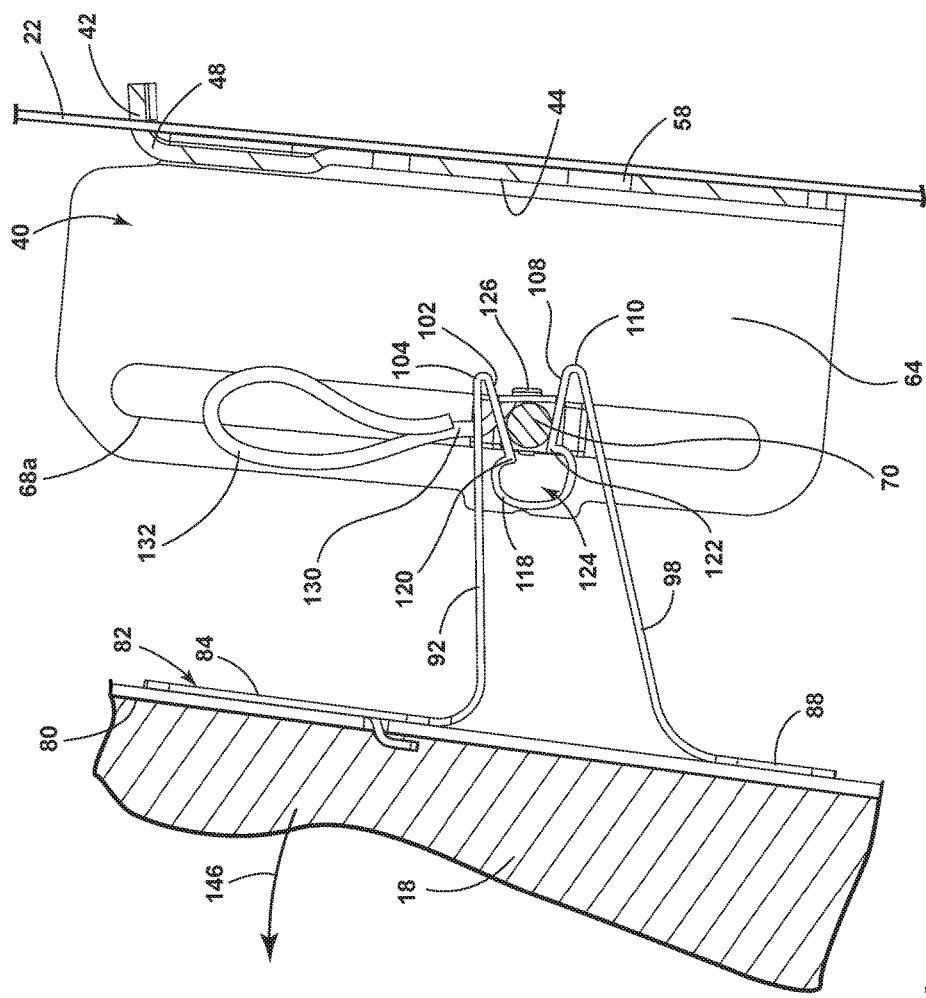
FIG. 18 is a cross-sectional side view of the latch of FIG. 8 and mounting bracket of FIG. 3, illustrating a force attempting to pivot the seatback away from the rear wall portion but the one-way stop prevents the latch from disengaging with the laterally extended rod.
Figure 19:
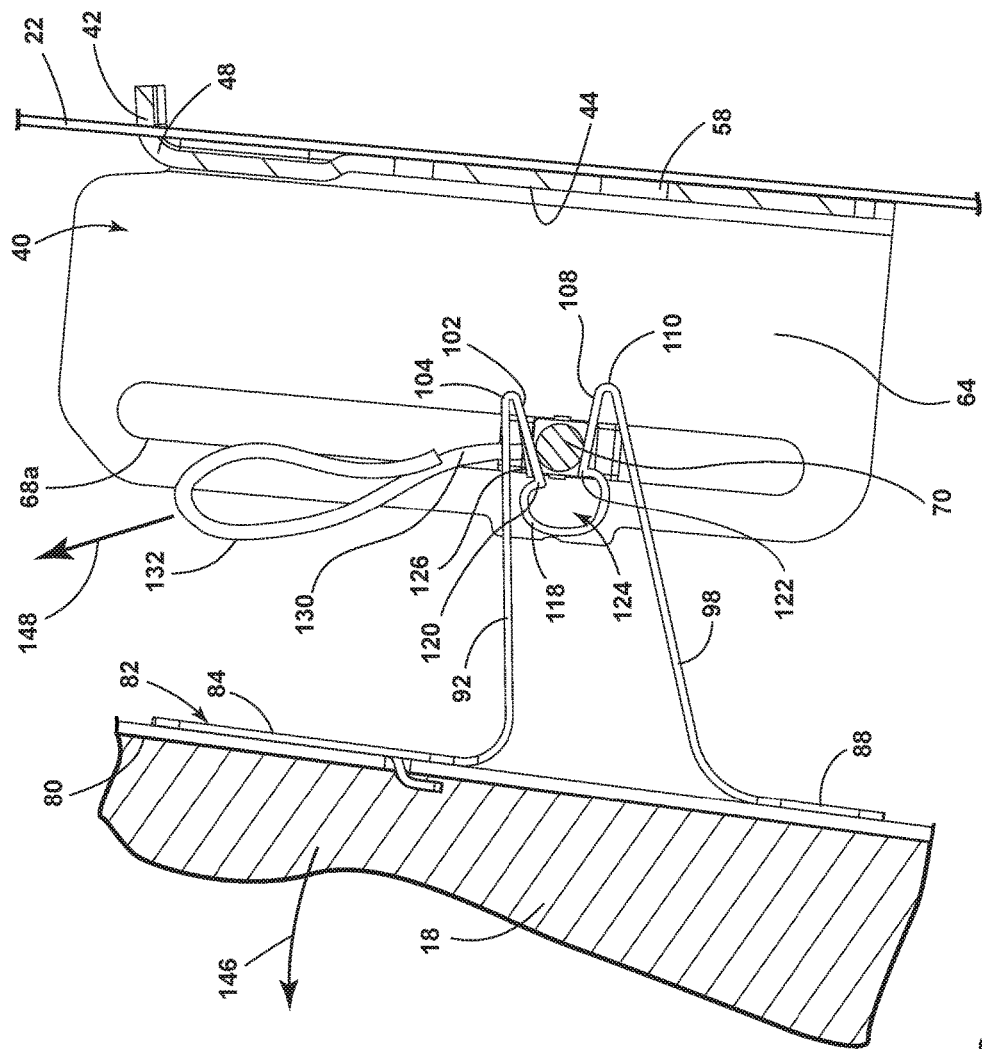
FIG. 19 is a cross-sectional side view of the latch of FIG. 8 and mounting bracket of FIG. 3, illustrating a force on the release element of the one-way stop moving the one-way stop so that the latch can disengage from the laterally extended rod and allow the seatback to move to the first position (unlatched).

Referring to FIGS. 15-17, the act of the latch 82 latching the seatback 18 to the rear wall portion 22 of the frame 20 of the vehicle 10 is illustrated in sequence, demonstrating the seatback 18 moving from the first position 36 (unlatched) to the second position 38 (latched). In turn, FIGS. 18 and 19 illustrate how the seatback 18 is prevented from moving back to the first position 36 (unlatched) unless the release element 130 connected to the one-way stop 126 is pulled.

More specifically, in FIG. 15, the seatback 18 is illustrated in the first position 36 (unlatched). In this first position 36, the seatback 18 is pivoted away from the rear wall portion 22 of the frame 20. The retainer portion 118 of the latch 82 is not surrounding the laterally extended rod 70. The retaining channel 124 is not retaining the laterally extended rod 70. The retainer portion 118 is not interacting with the laterally extended rod 70. The latch 82 is not latched to the laterally extended rod 70.

In FIG. 16, a force 144 is applied to the seatback 18 moving (in this embodiment, pivoting) the seatback 18 from the first position 36 to the second position 38. As illustrated, in this movement, the laterally extended rod 70 contacts and deflects the first interface portion 102 (in this embodiment, upward). The laterally extended rod 70 additionally contacts and may deflect the second interface portion 108 (in this embodiment, downward). The laterally extended rod 70 pushes the opposing surfaces 114, 116 of the first interface portion 102 and the second interface portion 108, respectively, apart. The laterally extended rod 70 causes the first retaining lip 120 and the second retaining lip 122 to move apart relative to each other. The laterally extended rod 70 continues to deflect the first interface portion 102 (and push the opposing surfaces 114, 116 of the first interface portion 102 and the second interface portion 108 apart) until the first retaining lip 120 is forced over the laterally extended rod 70 and the retainer portion 118 is adjacent to the laterally extended rod 70 and at least partially surrounding the laterally extended rod 70. The laterally extended rod 70 causes the first retaining lip 120 and the second retaining lip 122 to move apart until the first retaining lip 120 and the second retaining lip 122 are forced over the laterally extended rod 70 as the laterally extended rod 70 slides into (enters) the retaining channel 124. At that point the first retaining lip 120 and the second retaining lip 122 move closer together and, likewise, the opposing surfaces of the first interface portion 102 and the second interface portion 108 come closer together.

As the seatback 18 is moving from the first position 36 to the second position 38, the laterally extended rod 70 forces the one-way stop 126 up into the first opening 106 such that the one-way stop 126 is more planar with the first interface portion 102. The one-way stop 126 slides over the laterally extended rod 70 until the one-way stop 126 passes the laterally extended rod 70 and the laterally extended rod 70 enters the retaining channel 124. The one-way stop 126 then springs back down to its natural position (as in FIG. 9), which acts as a blocking position after the laterally extended rod 70 has entered the retaining channel 124, as explained below.

In FIG. 17, the seatback 18 is now in the second position 38 (latched position). In this second position 38, the seatback 18 has pivoted toward the rear wall portion 22 of the frame 20 and is latched thereto. The retainer portion 118 of the latch 82 at least partially surrounds the laterally extended rod 70 and, in this embodiment, nearly surrounds the entire circumference of the laterally extended rod 70. The laterally extended rod 70 is within the retaining channel 124. The one-way stop 126 is near or within the second opening 112 adjacent the second retaining lip 122. The retaining channel 124 retains the laterally extended rod 70, unless a force is applied attempting to separate the seatback 18 from its position near the rear wall portion 22 of the frame 20.

In FIG. 18, such a force 146 is being applied to the seatback 18 attempting to pivot the seatback 18 away from the rear wall portion 22. However, when the one-way stop 126 has slid over the laterally extended rod 70 and the laterally extended rod 70 is within the retaining channel 124, the one-way stop 126 prevents the latch 82 from disengaging with the laterally extended rod 70 when the force 146 is applied to the seatback 18 in a direction away from the rear wall portion 22. The one-way stop 126 prevents the seatback 18 from moving back to the first position 36 (unlatched). The one-way stop 126 blocks the gap between the first interface portion 102 and the second interface portion 108 when a force is applied such that the laterally extended rod 70 forces the first retaining lip 120 and the second retaining lip 122 apart as the force 146 separates the retaining channel 124 from retaining the laterally extended rod 70. The one-way stop 126 maintains the laterally extended rod 70 between the one-way stop 126 and the retainer portion 118.

In FIG. 19, however, a force 148 is applied to manipulate the release element 130 (in this embodiment, a line) in a direction (in this embodiment, up) so that the one-way stop 126 no longer prevents the latch 82 from disengaging with the laterally extended rod 70 when the force 146 is applied to the seatback 18 to pivot the seatback 18 away from the rear wall portion 22. Thus, the seatback 18 can return to the first position 36 (unlatched). The release element 130 may be difficult to access in order to limit the ability to unlatch the seatback 18 from the rear wall portion 22 to personnel that service and maintain the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A latch to latch a seatback to a frame of a vehicle comprising:
a first seatback attachment portion configured to be attached to a seatback of a vehicle;
a first extended portion connected to the first seatback attachment portion that extends generally rearward from the first seatback attachment portion;
a first interface portion connected to the first extended portion at a first bend that extends at an angle downward and forward from the first bend; and
a retainer portion connected to the first interface portion at a bend forming a first retaining lip, the retainer portion forming a retaining channel configured to at least partially surround a rod mounted upon a frame of the vehicle to latch the seatback to the frame.

2. The latch of claim 1 further comprising:
a second seatback attachment portion configured to be attached to a seatback of a vehicle; and
a second extended portion connected to the second seatback attachment portion that extends generally rearward from the second seatback attachment portion.

3. The latch of claim 2 further comprising:
a second interface portion connected to the second extended portion at a second bend that extends at an angle upward and forward from the second bend.

4. The latch of claim 3, wherein the retainer portion is connected to the second interface portion at a bend forming a second retaining lip.

5. The latch of claim 4, wherein the first retaining lip is adjacent the second retaining lip.

6. The latch of claim 5 further comprising:
a one-way stop connected to the first interface portion that extends at an angle more toward the second retaining lip than the first retaining lip.

7. The latch of claim 6 further comprising:
a release element interconnected with the one-way stop.

8. The latch of claim 7, wherein the release element includes a loop portion, the first extended portion includes an aperture, and the release element extends through the aperture and terminates with the loop portion.

9. The latch of claim 1 further comprising: stamped metal having a thickness between 0.5 mm and 1.0 mm;
wherein the stamped metal is spring steel.

10. The latch of claim 2, wherein the first seatback attachment portion is parallel to the second seatback attachment portion.

11. A vehicle comprising:
a frame including a rear wall portion;
a laterally extended rod mounted upon the rear wall portion;
a seatback pivotally attached to the vehicle at a seatback pivot, the seatback comprising a latch, the latch comprising:
a first seatback attachment portion;
a first extended portion connected to the first seatback attachment portion that extends generally rearward from the first seatback attachment portion;
a first interface portion connected to the first extended portion at a first bend that extends at an angle downward and forward from the first bend; and
a retainer portion connected to the first interface portion at a bend forming a first retaining lip;
wherein the seatback is capable of moving from:
a first position, wherein the seatback is pivoted away from the rear wall portion and the retainer portion does not surround the laterally extended rod; to
a second position, wherein the seatback is pivoted toward the rear wall portion and the retainer portion at least partially surrounds the laterally extended rod.

12. The vehicle of claim 11, wherein, as the seatback moves from the first position to the second position, the laterally extended rod contacts and deflects the first interface portion before the retainer portion at least partially surrounds the laterally extended rod.

13. The vehicle of claim 11, wherein the retainer portion connects with a second interface portion at a bend forming a second retaining lip that is adjacent the first retaining lip;
wherein the retainer portion forms a retaining channel; and
wherein, in the second position, the laterally extended rod is within the retaining channel.

14. The vehicle of claim 13, wherein, as the seatback moves from the first position to the second position, the laterally extended rod causes the first retaining lip and the second retaining lip to move apart until the first retaining lip and the second retaining lip are forced over the laterally extended rod as the laterally extended rod slides into the retaining channel, at which point the first retaining lip and the second retaining lip move closer together.

15. The vehicle of claim 13 further comprising:
a one-way stop connected to the first interface portion that extends through a first opening in the first interface portion at a greater downward angle than the first interface portion extends from the first bend.

16. The vehicle of claim 15, wherein, as the seatback moves from the first position to the second position, the one-way stop slides over the laterally extended rod; and wherein, when the seatback is in the second position, the one-way stop prevents the latch from disengaging with the laterally extended rod when a force is applied to the seatback away from the rear wall portion and the seatback cannot move back to the first position.

17. The vehicle of claim 15 further comprising:

a line interconnected to the one-way stop, the line including a loop portion;

wherein, when the line is pulled, the one-way stop no longer prevents the latch from disengaging with the laterally extended rod when a force is applied to the seatback away from the rear wall portion and the seatback can move back to the first position.

18. A vehicle comprising:

a frame including a rear wall portion comprising a rod having a radius; and a seatback pivotally attached to the vehicle at a seatback pivot, the seatback comprising a latch, the latch comprising:

opposing surfaces, a distance between which narrows from a value greater than the twice the radius of the rod to a value less than twice the radius of the rod; and a retaining channel to retain the rod.

19. The vehicle of claim 18, the seatback further comprising a latched position and an unlatched position;

wherein, in the latched position, the retaining channel retains the rod;

wherein, in the unlatched position, the retaining channel does not retain the rod; and wherein, as the seatback moves from the unlatched position to the latched position, the rod pushes the opposing surfaces apart and subsequently the rod enters the retaining channel, thereafter the opposing surfaces come closer together.

20. The vehicle of claim 19, the latch further comprising a tab that moves into a blocking position that prevents the seatback from moving to the unlatched position after the rod has entered the retaining channel.

* * * * *